US007630706B2

(12) United States Patent
Weigand

(10) Patent No.: US 7,630,706 B2
(45) Date of Patent: Dec. 8, 2009

(54) DYNAMICALLY DISTRIBUTED, PORTAL-BASED APPLICATION SERVICES NETWORK TOPOLOGY FOR CELLULAR SYSTEMS

(75) Inventor: David L. Weigand, Santa Clara, CA (US)

(73) Assignee: Exphand Inc., San Francisco, CA (US)

( * ) Notice: Subject to any disclaimer, the term of this patent is extended or adjusted under 35 U.S.C. 154(b) by 511 days.

(21) Appl. No.: 11/328,685

(22) Filed: Jan. 9, 2006

(65) Prior Publication Data

US 2006/0111095 A1    May 25, 2006

(51) Int. Cl.
*H04M 3/00* (2006.01)
(52) U.S. Cl. .................. 455/418; 455/419; 455/445
(58) Field of Classification Search .............. None
See application file for complete search history.

(56) References Cited

U.S. PATENT DOCUMENTS 6,557,753 B1 *   5/2003   Beaujard et al. ............ 235/375
6,678,524 B1     1/2004   Hansson et al.
6,745,012 B1     6/2004   Ton et al.
2002/0131395 A1*  9/2002   Wang ...................... 370/349

* cited by examiner

*Primary Examiner*—Lester Kincaid
*Assistant Examiner*—Phuoc Doan
(74) *Attorney, Agent, or Firm*—Michael A. Glenn; Glenn Patent Group

(57) ABSTRACT

Methods, apparatuses and systems directed to a portal-based, dynamically distributed application topology for cellular systems. The portal-based application topology, in one implementation, is an application architecture featuring strategic dynamic distribution of the man-machine interface (such as data acquisition and information presentation) and the back-end processing aspects, of a particular application. In one implementation, all terminal interfacing aspects (such as data acquisition, data presentation) are formatted and handled by systems associated with a cellular system operator, as described below, while background processing is performed by a processing facility remote to the cellular system operator. In one implementation, the distributed application topology allows a mobile station, such as a cellular telephone, to simply act as a thin-client accessing an application server via a cellular systems operator's web portal for page-based interface screens.

7 Claims, 2 Drawing Sheets

Fig._1

DYNAMICALLY DISTRIBUTED, PORTAL-BASED APPLICATION SERVICES NETWORK TOPOLOGY FOR CELLULAR SYSTEMS

CROSS-REFERENCE TO RELATED APPLICATION

The present application claims the benefit of U.S. patent application Ser. No. 10/753,774 filed on Jan. 8, 2004 (now issued as U.S. Pat. No. 7,054,637) which in turn claims the benefit of U.S. Provisional Application Ser. No. 60/506,407 filed Sep. 26, 2003. The foregoing applications are hereby incorporated by reference in their entirety.

FIELD OF THE INVENTION

The present invention relates to cellular system technologies and, in one implementation, to a portal-based, dynamically distributed application services network topology for cellular systems.

BACKGROUND OF THE INVENTION

Cellular telephony is a type of full duplex wireless telecommunication in which a subscriber has a wireless connection from a mobile station (such as a cellular telephone) to a relatively nearby transceiver. The transceiver's span of coverage is called a cell. Each cell is served by its own radio telephone and control equipment, such as a base transceiver station. All the cells in a cellular system are connected to a Mobile Telephone Switching Office (MTSO) or Mobile Switching Center (MSC). The MTSO or MSC controls the switching between the Public Switched Telephone Network (PSTN) and the cell site for all wireline-to-mobile and mobile-to-wireline calls. The MTSO also processes mobile unit status data received from the cell-site controllers, switches calls to other cells, processes diagnostic information, and compiles billing statistics.

Cellular telephones typically host a variety of applications, such as personal information managers, telephony-related applications, games, micro-browsers, and the like. Traditionally, applications used in cellular telephones are either implemented as an embedded software application developed in C, C++ or other native code by the handset manufacturer, or as a Java applet download and executed by a Java virtual machine previously installed on the handset by the handset manufacturer.

These embedded or Java applications, however, do present certain limitations to application developers. For example, updates to embedded applications must be installed on each individual handset. Moreover, the handset Man-Machine Interface (MMI) and the "look & feel" of the embedded application suite are largely controlled by the cellular telephone manufacturer. In addition, the interface provided by Java applications executed on cellular telephones is often quite different from the interface provided by native applications, disrupting a consistent "look & feel" of the interfaces provided to the handset user.

Certain embedded applications, such as micro-browsers or special-purpose client applications, allow cellular telephones to access applications and services provided by external servers and systems over the cellular network. For example, using wireless networking protocols, such as the Wireless Access Protocol (WAP), a smart phone running a micro-browser can access a vast array of content and application services, such as information services. For example, a micro-browser can establish a connection to a WAP gateway, which provides access to content and applications accessible on the Internet or other external packet data network. WAP gateways typically reside within the wireless carrier's network; however, wireless device users can also establish a dial-up data connection to a WAP gateway or WAP server maintained by an Internet Service Provider (ISP) or a business enterprise.

A WAP gateway is a proxy that intermediates sessions between WAP-compliant wireless devices and application servers. Typically, WAP gateways translate between cellular wireless networking protocols (e.g., WAP, etc.) and packet data network protocols such as TCP, HTTP, HTML, and the like. A typical browsing session, using a circuit-based or dial-up connection, proceeds as follows: When a micro-browser on a mobile station is launched, the mobile station places a call to an access server, which authenticates the mobile station and controls access to the WAP gateway. After the user has been validated, the mobile station communicates directly with the WAP gateway. The WAP gateway, in certain implementations, can provide to the micro-browser a home page deck that includes links and services available on the WAP gateway. When a link is selected, or a URL is specified, the micro-browser transmits a Wireless Session Protocol (WSP) request to the WAP gateway. The WAP gateway translates the WSP request to an HTTP request, for example, and transmits it to an application server on the public data network. The WAP gateway also converts the HTTP response to a WSP response and transmits it to the micro-browser.

Traditionally, wireless applications executed on cellular phones, such as micro-browsers, relied primarily on circuit-switched connections dependent on circuit availability. That is, a cellular phone establishes a dial-up connection with a gateway or server in a manner similar to a dial-up connection between modem on a desktop computer and an ISP's remote system. However, packet-switched cellular bearer services allow for connections with remote systems in a different manner. For example, cellular service providers in the United States have recently started to roll out packet-switched cellular networks, such as the General Packet Radio Services (GPRS) network. A packet-switched connection, using the Internet Protocol (IP), means that a virtual connection is always available to any other end point in the network.

These cellular application topologies present certain limitations and disadvantages, however, to external application services providers and cellular system operators. For example, web application servers, accessible via a WAP gateway, cannot identify and target particular cellular telephones, screen sizes or color plane depths, since they often serve personal computers and/or a large variety of wireless device types. Moreover, the user experience associated with external application services may also suffer from the wide variety of wireless device types, each having varying capabilities and features, such as different screen types, color palettes, "look and feel" interfaces, and the like. Still further, these cellular application topologies also present certain performance issues, since it is up to the external application service provider to decide the content delivery mode for all cellular systems, as opposed to leaving this decision to each cellular system operator who is in the best position to know the capabilities of the cellular system and the best mode for data or service delivery.

Existing cellular application topologies also limit the opportunities for custom-branding opportunities, since external application servers connected to packet data networks cannot distinguish between mobile stations associated with different wireless carriers. Accordingly, the "look and feel" of a given application cannot be tailored or customized as desired by the cellular system operator. In addition, given the extensive application processing facilities often required to host a given application service, installing application servers and other systems locally to the wireless carrier's operational centers and systems is also problematic. For example, changes to an application service such as additional functionality would automatically require configuration changes to the systems installed at each wireless carrier facility.

In light of the foregoing, a need exists in the art for methods, apparatuses and systems that facilitate the configuration and implementation of application services over cellular wireless networks. A need further exists for methods, apparatuses and systems that facilitate the configuration and implementation of application services that are customized or otherwise tailored for each wireless carrier. Various implementations of the present invention substantially fulfill these needs.

SUMMARY OF THE INVENTION

The present invention provides methods, apparatuses and systems directed to a portal-based, dynamically distributed application service network topology for cellular systems. The portal-based application topology, in one implementation, is an application architecture featuring strategic dynamic distribution of the man-machine interface (such as data acquisition and information presentation) and the back-end processing aspects, of a particular application. In one implementation, all terminal interfacing aspects, which define the application "look and feel", (such as data acquisition and data presentation) are formatted and handled by systems associated with a cellular system operator, as described below, while background processing is performed by a processing facility remote to the cellular system operator. In one implementation, the distributed application topology allows a mobile station, such as a cellular telephone, to simply act as a thin-client accessing an application server via a cellular systems operator's web portal for page-based interface screens.

This portal-based, dynamically distributed application topology, in one implementation, allows the man-machine interface (MMI) (e.g., the handset's look and feel) and content to be provided by an application server on the cellular system provider's network, through the wireless carrier's web portal. Additionally, this architecture enables the wireless operator content to be dynamic and augmentable with ad content, branding and the like. In one implementation, data processing and database management tasks are done on servers at a remote application service processing facility operably connected to an external packet data network. The application server and the remote processing facility can communicate over the Internet using standard network protocols. One skilled in the art will recognize that the partitioning of tasks between the application interface server and the remote application back end processing facility can be dynamically adjusted based on a variety of factors.

Depending on the implementation, the present invention achieves one to a plurality of benefits or advantages: It reduces individual application development for each handset model enabling greater model coverage, better model penetration and faster time-to-market application service rollout. It drives cellular system operator revenue due to more bandwidth usage with uplink and downlink Pull and PUSH technology. It allows MMI and complete system upgrades across all handsets by simply upgrading the network application by either the application service provider or the cellular system operator. It creates a common application interface across all handsets which can be managed from an application server. Cellular system operators can easily augment and/or customize the "look and feel" of a given application. For example, the distributed portal-based application topology allows cellular system operator-specific content augmentations for ads, trademarks, logos, branding, etc. It provides the application service provider close alignment with cellular system operators as well as the handset providers. It enables the user database to be managed by the Application Service Provider (ASP) server and viewed directly from the server alleviating the requirement of an embedded database on the handset. Alternatively, a thin-database can be mirrored on the terminal. The portal-based, dynamically distributed processing architecture opens opportunities for strategic relationships with operators and dot.com providers. The present invention also affords cellular system operators the ability to provide phone content and have a presence on the phone, thereby, building an identity on the phone or other wireless device instead of only the handset manufacturer having an identity.

DESCRIPTION OF PREFERRED EMBODIMENT(S)

Figure 1:
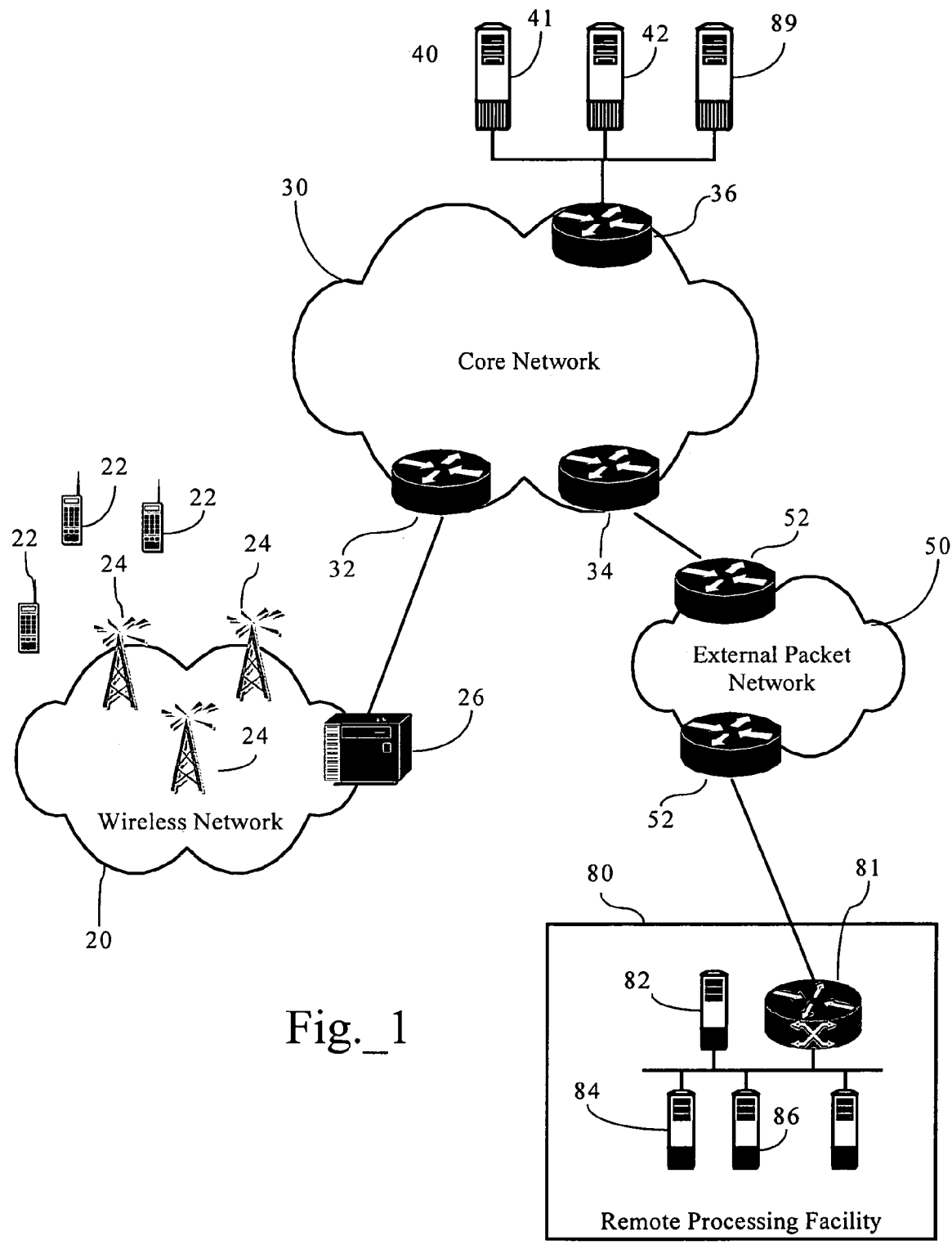
FIG. 1 is a functional block diagram illustrating a Dynamically Distributed, Portal Based Application Network Topology according to an embodiment of the present invention.

FIG. 1 is a functional block diagram illustrating a Dynamically Distributed Portal Based Application Network Topology according to an embodiment of the present invention. As FIG. 1 illustrates, in one implementation, the present invention operates in connection with at least one wireless network 20, core network 30, and external packet data network 50.

As discussed more fully below, wireless network 20 enables one or more wireless mobile stations 22 to establish connection with remote devices, such as other mobile stations, POTS telephones, and computing resources on external packet data network 50, for the transmission of voice or other data therebetween. In one embodiment, wireless network 20 includes at least one base station 24 (or other radio transmit/receive unit) operably connected to a base station controller 26 (e.g., a Base Station Controller (BSC), a Radio Network Controller (RNC), etc.).

The present invention can be deployed in connection with one to a plurality of wireless network types. For example, wireless network 20 may be a cellular or Personal Communication System (PCS) network employing several possible technologies, including Time Division Multiple Access (TDMA), Code Division Multiple Access (CDMA), and Frequency Division Multiple Access (FDMA) communication. Communication of data between mobile stations 22 and application server 89 can occur over any suitable bearer service. In one implementation, mobile stations can establish circuit-switched or dial-up connections to application server 89 or a WAP gateway associated with the wireless carrier. For example, in GSM networks, Short Message Service (SMS) or Circuit-Switched Data (CSD) bearer services may be used. In addition, mobile stations 22 may establish packet-switched connections to application server 89 using General Packet Radio Services (GPRS) bearer services. Other bearer service types may include High-Speed Circuit-Switched Data (HSCSD), Enhanced Data GSM Environment (EDGE).

Wireless network 20 can also be a Universal Mobile Telecommunications Service (UMTS) network enabling broadband, packet-based transmission of text, digitized voice, video, and multimedia.

Figure 2:
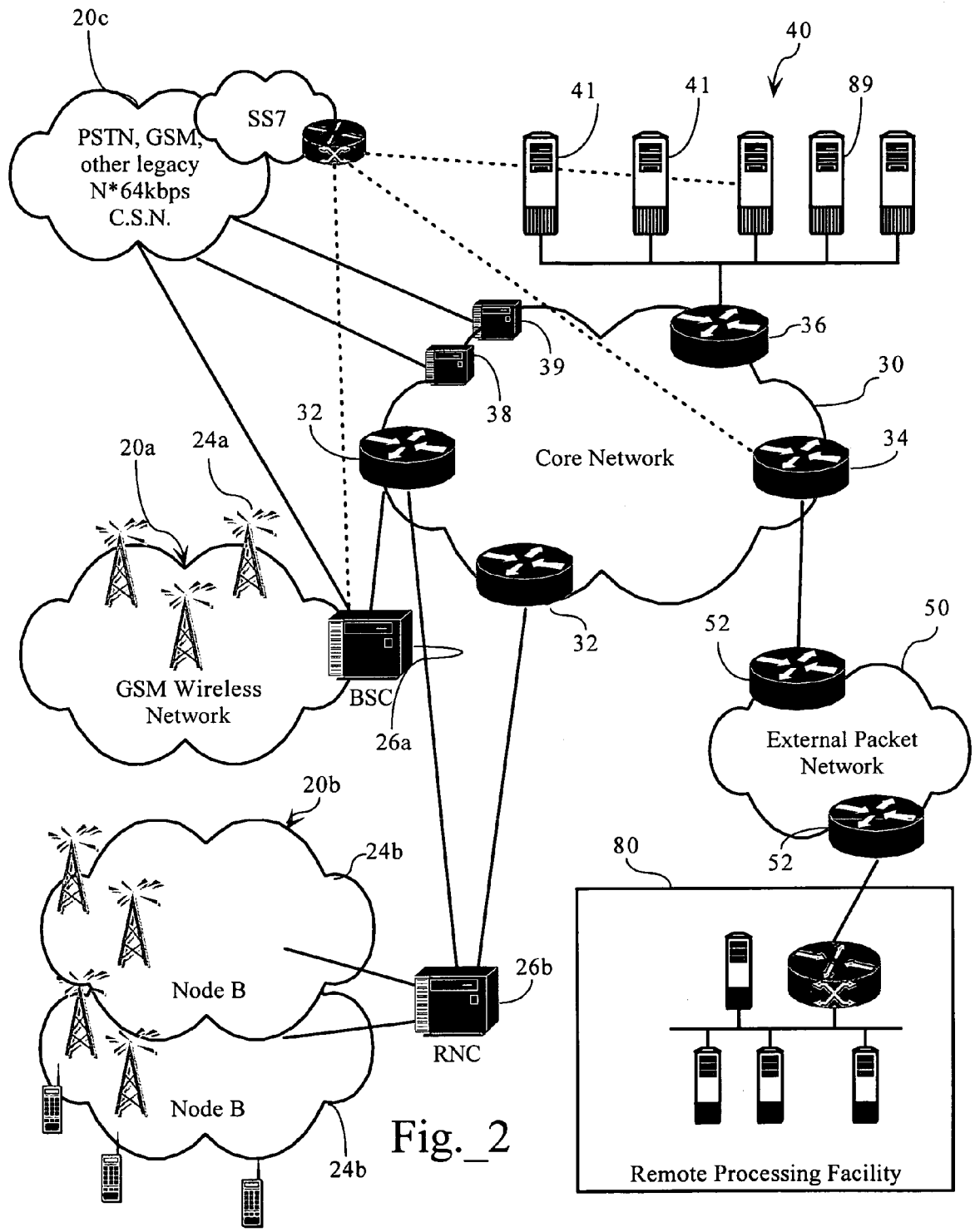
FIG. 2 is a functional block diagram showing a distributed portal based application network topology deployed in an environment including a plurality of wireless network types.

As FIG. 2 illustrates, the present invention can be deployed in an environment involving multiple wireless network types. For example, core network 30 may be operably connected to a GSM network 20a, including one or more base stations 24a and base station controllers 26a. Base station controller 26a may be logically associated with a packet control unit to operate in connection with at least one Serving GPRS Support Node 32 and at least one Gateway GPRS Support Node 34 to provide packet-switched network services. Core network 30 may also support a packet-switched UMTS network 20b comprising one or more Node Bs 24b and at least one radio network controller 26b. Core network 30 may also support circuit-switched wireless networks, such as traditional GSM, PCS or cellular networks 20c.

Accordingly, wireless network 20 may comprise a variety of systems and subsystems. For example, in a GSM network 20a, the wireless network may comprise one or more base transceiver stations 24a operably connected to a base station controller 26a. As FIG. 2 illustrates, the base station controller 26a is connected to core network 30 via a SGSN 32 which handles access control and other tasks associated with GPRS services for mobile stations 22 accessing the network. In GPRS networks, the base station controller 26a may include a packet control unit which operates in connection with at least one SGSN and a GGSN to provide the GPRS service to mobile stations 22. Core network 30 may further include a mobile telephone switching office (MTSO) or mobile switching center (MSC) that connects the landline PSTN system to the wireless network system, and is also responsible for handing off calls from one cell or base station to another. FIG. 2 also illustrates UMTS network 20b comprising one or more node Bs 24b operably connected to a radio network controller 26b. Core network 30 may further include media gateway 38, a switching device that terminates circuit-switched channels from a wireless network 20c and connections from packet-switched, core network 30, that supports access to voice and data services for other wireless network types.

Core network 30 includes functionality supporting operation of the wireless network 20, as well as functionality integrating circuit- and packet-switched network traffic. In one embodiment, core network 30 comprises at least one routing device, such as router 36, to route data packets between nodes connected to the core network 30. As discussed above, in one implementation, core network 30 includes at least one Gateway GPRS Support Node (GGSN) 34, and at least one Serving GPRS Support Node (SGSN) 32. The Gateway GPRS Support Node 34 supports the edge routing function of the core network 30. To external packet data networks, such as network 50, the GGSN 34 performs the task of an IP router. In one implementation, the GGSN 34 also includes firewall and filtering functionality, to protect the integrity of the core network 30. The SGSN 32, in one implementation, connects a base station controller 24 to core network 32. The SGSN 32, in one implementation, keeps track of the location of an individual mobile station 22 and performs security functions and access control. Of course, one of ordinary skill in the art will recognize that the systems employed within, and the functionality of, core network 30 depend on the wireless network type(s) that it supports.

External packet data network 50 is a packet-switched network, such as the Internet or an intranet. In one embodiment, external packet data network 50 is an Internet Protocol (IP) network; however, packet data network 50 can employ and suitable network layer and/or routing protocols. As FIG. 1 illustrates, external packet data network 50 includes at least one routing device 52 for the routing of datagrams or packets between end systems.

In one implementation, router 36 interconnects cellular operator server farm 40 to core network 30. Cellular operator server farm 40 includes at least one server or other computing device implementing functionality associated with, enabling, and/or facilitating operation of wireless network 20. For example, cellular operator server farm 40, in one implementation, comprises signaling gateway 41, and Home Location Register (HLR) 42. Operator server farm 40 may further include a Visitor Location Register (VLR), DNS servers, WAP gateways, email servers and the like. In one implementation, cellular operator server farm 40 further includes application server 89, which as discussed below operates in connection with remote processing facility 80 to provide an application service to mobile stations 22 over wireless network 20.

Remote processing facility 80 operates in connection with application server 89 to provide an application service to mobile stations 22. As FIG. 1 illustrates, remote processing facility 80, in one implementation, is operably connected to external packet data network 50 via router 81. In one implementation, remote processing facility 80 includes a Local Area Network (LAN) interconnecting a plurality of servers and other computing devices. In one implementation, remote processing facility 80 may comprise a communications server 82, a remote processing server 84, and a database server 86. Communications server 82 is operative to establish communications sessions with application server 89 located within wireless operator server farm 40. Remote processing server 84 is operative to receive messages forwarded to it by communications server 82, process data in the messages and, in one implementation, compose responsive messages. Database server 86 hosts one or more databases, such as user account databases, content databases, and the like. As one skilled in the art will recognize, although FIG. 1 illustrates separate physical servers, the functionality corresponding to communications server 82, remote processing server 84 and database server 36 may be implemented on a single physical server or other computing device.

As discussed above, application server 89 and remote processing facility 80 interact to provide an application service to mobile stations 22. In one implementation, application server 89 directly supports interfacing aspects of the application service, while remote processing facility 80 performs background processing and other functionality, such as processing of data received from mobile stations 22, database queries, and the like. In one implementation, remote processing facility 80 provides raw data associated with an application service to application server 89, which post-processes the raw data, formats the data for wireless transmission, and transmits it to the mobile stations 22. The application server 89 and the remote processing facility 80 can communicate over the packet data network 50 using standard network protocols. In one embodiment, application server 89 and remote processing facility 80 employ HTTP and TCP protocols to transmit messages, such as requests and responses. In one embodiment, application server 89 and remote processing facility 80 employ the Simple Object Access Protocol (SOAP) to exchange messages. Of course, any suitable one-way or two-way messaging protocols can be used. In addition, for applications requiring security, application server 89 and remote processing facility 80 may use secure tunneling and/or encryption protocols.

Mobile stations 22, in one implementation, include browser client functionality, such as micro-browsers operative to receive data and files directly from servers connected to core network 30, or indirectly via a WAP gateway or other proxy. As discussed above, a variety of circuit-switched or packet-switched bearer services can be employed to connect mobile stations 22 to application server 89. For example, mobile stations 22 may be configured to establish a dial-up connection to application server 89 directly, or indirectly via a WAP gateway. In one embodiment, mobile station 22 is a smart phone providing digital voice service as well as web access, via a micro-browser. Mobile station 22 may also be a wireless personal digital assistant including a micro-browser. The micro-browser may comply with one to a combination of wireless access protocols, such as WAP, HDML, i-mode, cHTML and variants of any of the foregoing. In one implementation, at least one mobile station 22 may include functionality supporting SMS and/or MMS messaging. In one implementation, at least one mobile station 22 may include digital image capture functionality, allowing users to capture digital images and transmit them to remote hosts. In yet another implementation, the mobile station 22 may include a special-purpose client that is configured to interact directly with application server 89, as opposed to a general purpose micro-browser. In one implementation, the special-purpose client application may be configured to control the digital camera functionality of mobile station 22 and transmit captured images to application server 89.

Accordingly, application server 89 may provide one to a variety of content types, such as WML, cHTML, HDML, etc. to the mobile stations depending on the browser client type identified in a request. As discussed above, since application server 89 is unique to the operations of the wireless carrier, the interface content provided by the application server 89 may be customized on a per-wireless-carrier basis. Accordingly, the distributed portal-based application topology allows an application service provider to maintain a single remote processing facility 80 providing the background processing operations that support one or more application servers 89, where each of the application servers 89 include customized content, such as specific advertisements, branding, logos, etc. in each interface page, or differentiated application services.

In one implementation, at least one mobile station 22 is configured with a "hot-key" or voice command interface, which when activated causes mobile station 22 to launch a thin-client application specifically configured to access (e.g., transmit a request to) application server 89. In one implementation, the specially configured client application is a stripped-down micro-browser or thin-client that includes page rendering capabilities and a display window, but lacks the interface controls commonly found on a micro-browser, such as a URL fields, "back", or "reload" controls. As discussed below, a mobile station 22 may further include a touch-sensitive display allowing the user to generate inputs by touching the displaying screen at selected locations of the display window provided by the thin-client application. The client application, in one implementation, at start up transmits a request to application server 89, which responds with a page including an interface associated with the application hosted by application server 89. The page may include interface controls and links that the user may select. As with micro-browsers, the thin client application responds to the user's input or selection by composing a request based on the user's selection and, transmitting it to application server 89. Application server 89 processes the request and transmits a response including a page-based interface. In this manner the user interface is essentially hosted by application server 89, as opposed to being provided by an embedded or Java application residing on mobile station 22.

Accordingly, variety of applications and interfaces can be provided to the user, even common telephony applications, such as dialing users from an address book. For example, the user's address book may be stored remotely to mobile station 22. When the user presses a "phone book" hot-key, for example, the thin-client application launches and transmits a request to application server 89. In one implementation, the request identifies the user and/or mobile station 22. The application server 89 may respond by transmitting a log-in interface to the user. Thereafter, the application server 89 may access a phone book database to provide interface pages to the user listing the user's contacts. The thin-client application may display the contacts as hypertext links or links to a script, which when activated cause the mobile station 22 to dial the selected contact. Still further, one implementation of the present invention may obviate the need for a key-pad on mobile station 22, as the application server 89 may provide a page-based interface including a dialing application, such as a number-pad display that the user operates with the touch-screen display. When the user has completed the dialed number, he may select a "call" command which activates a script that dials the specified number. One skilled in the art will recognize how to create scripts that access various telephonic functions of mobile stations 22 based on the APIs provided by the mobile station manufacturer.

Application server 89, in one implementation, includes access control functionality and is accessible to mobile stations 22 in a manner similar to a WAP gateway. For example, when the hot-key is implemented, the mobile station 22 dials an access server that controls access to the application server 89. After validation, the mobile station 22 communicates directly with application server 89, which transmits a home page interface to the thin-client application implemented on the mobile station 22. In another implementation, the thin-client application may access application server 89 using a packet-switched bearer service, such as GPRS service. In another implementation, the "hot-key" when activated, launches a micro-browser that transmits a request to application server 89 using a circuit-switched, or GPRS (or other packet-switched) bearer service. In another implementation, the user may launch the micro-browser client and input the Uniform Resource Locator (URL) associated with application server 89 or select this URL from a list of bookmarks. In another implementation, the URL or other link to application server 89 may be included in the home page deck or WAP portal displayed by the micro-browser when it is initiated. Mobile stations 22 may also establish packet-switched connections to application server 89 via a GPRS or UMTS network.

In yet another implementation, the hot-key functionality of mobile station 22 may be configurable by the user and/or handset manufacturer. For example, a configuration application may allow the user to select a given hot-key (e.g., "1", "2", etc.) and associate an IP address, or URL with it. Accordingly, the hot-key when activated launches the thin-client application which transmits a request using the configured IP address or URL. In one implementation, the mobile station 22 may be configured to allow for implementation of a plurality of hot-keys each dedicated to a given application service.

As discussed above, application server 89 is configured to provide the man-machine interface to mobile stations 22, while accessing remote processing facility 80 for backend processing tasks associated with a given application service. In one implementation, the distributed application topology allows cellular system providers to configure and install an application server 89 that allows access to one or more application services hosted by remote processing facility 80. The application server 89 makes API calls to the remote processing facility 80 to access one or more operations. The remote processing facility 80, in one implementation, responds by providing raw data in return. The computer program or application implemented by application server 89, in one implementation, is written using a set of APIs, such as an interface specification, an Interface Definition Language (IDL) document, Web Services Description Language (WSDL) document, provided and/or published by remote processing facility 80. Accordingly, application server 89 may be configured and installed by the cellular system operator or the enterprise associated with remote processing facility 80. This architecture allows the cellular system provider to configure application server 89 to interact with the mobile stations 22 in a manner desired by the cellular system provider, such as to optimize response times. For example, the application server 89 can be configured to deliver the data provided by remote processing facility 80 intended for the mobile station 22 in a format optimized for transmission across the cellular network, or optimized for display be mobile station 22. Application server 89, in one implementation, can perform certain post-processing to the data transmitted by remote processing facility 80, such as the final MMS formatting of the message for wireless network 20 (e.g., for GSM, CDMA, TDMA, UMTS, etc.). For example, assume for didactic purposes that remote processing facility 80 returns images formatted as JPEG files to application server 89. Application server 89 may be configured to convert the JPEG image to a suitable image format for transfer over wireless network 20 to mobile station 22. For example, application server 89 may convert the image data to a format suitable for display by the thin-client application hosted by mobile station 22, or convert the image and transmit using an auxiliary communication channel, such as in an MMS message.

As one skilled in the art will recognize, this application topology allows each cellular system operator to make its own individual format and message delivery mode decisions.

Still further, the cellular system provider may configure application server 89 to serve customized content along with the interface pages, such as advertisements, logos and the like. Accordingly, remote processing facility 80 may support a single application service, but allow each individual cellular system provider to augment or customize the user's experience by providing customized interfaces, advertisements, logos and the like.

Furthermore, application server 89 may be configured to respond in a variety of ways to initial requests transmitted by mobile station 22. For example, application server 89 may transmit a log-in page prompting the user for a user name and password. Application server 89 may transmit the user name and password provided in the user's response to remote processing facility 80, which authenticates the user against a user account database maintained on database server 86. In such an implementation, remote processing facility 80 composes a response indicating whether the user has been authenticated and transmits it to application server 89. In another implementation, a user account database or a cached version of the user account database may be stored locally to application server 89. In another implementation, the fields of the Home Location Register may be extended to include one or more fields indicating whether the user (as identified by the device ID of mobile station 22) is allowed access to application server 89. For example, the Home Location Register may be extended to include a flag, the state of which determines whether application server 89 will allow access to the user.

In one implementation, upon initiation of a session with a mobile station 22, application server 89 generates a session ID and uses this session ID in messages transmitted to remote processing facility 80 to keep track of the correspondence between messages received from remote processing facility 80 and the user sessions. Other identifiers, such as user names, IP addresses, device IDs, and the like can be used in addition to, or in lieu of, the session IDs. Messages transmitted from application server 89 may include an application server identifier to allow remote processing facility to distinguish between multiple application servers 89 for accounting or other purposes. Still further, the messages transmitted between application server 89 and remote processing facility 80 may include digital certificates or digital signatures to allow for verification and the like. Still further, the messages transmitted between application server 89 and remote processing facility 80 may correspond to multiple, concurrent sessions to reduce the overhead associated with establishing connections to transmit data for each user session. In such an embodiment, the messages may include headers that identify the number of sessions to which the message applies. The body of the message may include the session IDs and/or other identifiers in association with the data corresponding to each session.

After receiving a message from remote processing facility 80 indicating a successful authentication, application server 89 may respond by transmitting a page providing a data acquisition interface to the user. For example, the data acquisition interface may prompt the user to enter a message code presented in a television or print advertisement. In another embodiment, the data acquisition interface may prompt the user to select a file corresponding to an image captured by the mobile station 22. In one implementation, after the user has completed the interface, the client application composes a message and transmits it to application server 89. In the case of a message code, for example, application server 89 may transmit the message code to remote processing facility 80, which accesses a database to identify content, such as an advertisement, coupon offer, etc., corresponding to the message code. Remote processing facility 80 can return any identified content to application server 89, which, in one implementation, coverts and adds the content to a page-based interface, and transmits the interface to the mobile station 22. In one implementation, application server 89 may also maintain a cache of content or data returned by remote processing facility 80 to reduce response times. A variety of known techniques can be employed to manage the cache and ensure that it includes users are provided the most recent content.

In addition, in the case where messages may contain digital image or source data, application server 89 can forward the digital source data to remote processing facility 80 for processing. For example, the digital images may include captured images of a television display including a message code. Remote processing facility 80 can include image processing and message code resolution functionality to process the image file to locate and resolve the message code and return content that corresponds to the message code. In one implementation, application server 89 can perform certain pre-processing operations, such as determining whether the file actually contains an image and/or is formatted properly. Such pre-processing operations, however, can also be performed by remote processing facility 80. One of ordinary skill in the art will recognize, however, that the partitioning of tasks or operations between the application server 89 and the remote processing facility 80 can be adjusted based on an evaluation of response times, network load, retry requirements of the system, the requirements of the application, and the desired quality of service. For example, application server 89 may act essentially to proxy transactions between mobile stations 22 and remote processing facility 80, providing only customized content, such as ads to the interface pages transmitted by remote processing facility 80. Furthermore, one of ordinary skill in the art will recognize that the application service set forth above represents one of myriad possible application services for which application server 89 and remote processing facility 80 may be configured.

A variety of content delivery options are possible. For example, remote processing facility 80 may be configured to transmit a message directly to the mobile station 22 using SMS or MMS functionality, such as an SMS/MMS gateway maintained by the cellular system operator. For example, the remote processing facility 80 may be configured to transmit an MMS message including a digital image of a coupon including a bar code to the mobile station. The user can then present the coupon to a point of sale location for redemption by displaying it on the display of mobile station. This MMS message may be transmitted in addition to, or in lieu of, a responsive message transmitted by application server 89 to the client application resident on mobile station 22.

Lastly, the present invention has been described with reference to specific embodiments. Other embodiments of the present invention will be apparent to one of ordinary skill in the art. It is, therefore, intended that the scope of the invention not be limited to the embodiments described above.

What is claimed is:

1. A dynamically distributed, portal-based communications processing system for use with multiple cellular wireless networks and including a core network operably connected to and supporting operation of the cellular networks, and an external packet data network coupled to the core network, the system comprising:

multiple mobile stations each associated with a designated one of the cellular wireless networks, each mobile station including a display and a special purpose thin-client programmed to interact with a designated application server including receiving messages including data representing interface pages, rendering the interface pages on the display, composing messages based on user-provided input, and transmitting the composed messages to the designated application server;

the thin-client of each mobile station being further programmed to rely on the designated application server for substantially all user interface functions of the mobile station communicating with the application server instead of using an embedded or application or a distributed downloadable application residing on the mobile station;

multiple application servers coupled to a shared remote processing facility, each application server designated for a given one of the cellular wireless networks, each application server programmed to conduct substantially all user interface functions for the mobile stations of a the given cellular wireless network as to interaction with said application server, each said application server programmed to perform operations including exchanging messages with the mobile stations including data representing the interface pages, and processing raw data from the remote processing facility into content suitably formatted for display particular to individual mobile stations being served, and customizing interface pages according to the specifications of the designated wireless carrier including any of specific advertisements, branding, logos, differentiated application services, and customized content; and the shared remote processing facility, programmed to serve the application servers of all of the cellular wireless networks by including hosting interface independent aspects of one or more predetermined application services including any of authenticating mobile station users, processing data received from mobile stations, executing database queries, and providing raw data associated with hosted services to the application servers.

2. The system of claim 1, where the thin-client of each mobile station is further programmed to perform operations including:

responsive to a prescribed hot-key activation or voice command, launching a thin-client application configured to access an associated application the designated application server;

responding to user input by composing a request based on the user input and transmitting a representative message to the designated application server.

3. The system of claim 2, each application server is further programmed to perform operations comprising:

responsive to a user of a mobile station activating an address book hot key causing the thin-client to transmit a request to the application server, the application server providing the thin-client with an interface to an address book stored remotely from the mobile station;

accessing an address book database and assembling and providing interface pages to the thin-client including a listing of address book contacts; and assembling and providing interface pages for the thin-client to display the contacts as hypertext links or links to a script that upon activation cause the mobile station to dial the selected contact.

4. The system of claim 1, where each thin-client includes a browser programmed to render pages and operate a display, and further programmed to demonstrate improve efficiency by omitting interface controls including any of manually entering a uniform resource locator (URL), BACK, and RELOAD.

5. The system of claim 1, the application servers and remote processing facility programmed to perform further operations as follows:

the application server providing a data acquisition interface to a mobile station prompting a mobile station user to perform one of the following: enter a message code from a television or print advertisement, or identify a file corresponding to an image captured by the mobile station;

responsive to receiving an entered message codes or an identified image, the application server transmitting the message code or image to the remote processing facility, and the remote processing facility accessing a database to identify content including an advertisement or coupon offer or other predetermined marketing content corresponding to the message code or image, and transmitting the identified content to the application server;

the application server formatting and adding the content to an interface page, and transmitting the interface page to the mobile station; and the application server additionally maintaining a cache of content received from the remote processing facility to reduce response times.

6. The system of claim 5, the remote processing facility further programmed to perform operations including:

responsive to receiving from a given one of the application servers an image captured by one of the mobile stations where said image includes a television display bearing a message code, the remote processing facility processing the image file to resolve and locate and identify the message code in the captured image;

retrieving from a database prescribed content that corresponds to the message code;

returning said retrieved content to the given application server.

7. The system of claim 1, where the application servers are coupled to the core network and the remote processing facility is coupled to the external packet data network.

* * * * *